UNITED STATES PATENT OFFICE 2,445,727

MOISTUREPROOF FILM

Siegfried M. Kinzinger, Montclair, N. J., assignor to The Firestone Tire & Rubber Company, Akron, Ohio, a corporation of Ohio No Drawing. Application August 25, 1944, Serial No. 551,267

3 Claims. (Cl. 260—28.5)

This invention relates to improved films comprising vinyl resins plasticized with butadiene-acrylonitrile type copolymers, and more particularly to the enhancement of the moisture resistance of such films.

It has been found that vinyl resins and butadiene-acrylonitrile type elastomers are compatible to yield plasticized compositions which may be formed into thin, self-supporting films. Such films are highly flexible, extensible but not elastic, and transparent, and are accordingly very well adapted as wrapping materials and the like. These films are inherently quite stable against atmospheric and light deterioration, and can be made even more so by incorporation therein of suitable stabilizing agents. They have a fair degree of resistance to transmission of water vapor therethrough, satisfactory for many purposes; however it would be very desirable to enhance the moisture resistance of these films for certain more refined applications such as, for instance, the packaging of delicate machines and machine components, moisture-sensitive food stuffs, and the like.

With a view to improving the moisture transmission resistance of films of vinyl resins plasticized with butadiene-acrylonitrile elastomers, the patentee conceived the idea of formulating these films with paraffin and like waxes to develop integral moisture resistance therein. Unfortunately, simple formulation of the films with waxes resulted, even at very low concentrations of wax, in commercially unacceptable clouding of the films. Moreover the incorporation of reasonable amounts of the waxes resulted in no improvement of, and in some cases in actual detriment to, the moisture transmission resistance of the films.

Accordingly it is an object of this invention to provide films of the type containing vinyl resins and butadiene-acrylonitrile elastomers which will have a high degree of resistance to the passage of moisture therethrough.

Another object is to provide such films which will have enhanced transparency.

A further object is to provide such films having a moistureproofing wax integrally incorporated thereinto.

A still further object is to obtain a moisture-proofing effect in such films by use of materials which are readily and cheaply procurable from reliable domestic sources.

The foregoing and other objects are secured in accordance with this invention by the incorporation, with observance of one or more special techniques, of from about 0.2% to about 2.0% of an amorphous or micro-crystalline paraffin or vegetable wax, into films of the type containing vinyl resins and butadiene-acrylonitrile elastomers. One successful technique to this end consists in forming the films by casting from a solution of the constituents (including the wax), using a solvent mixture constituted in part from a solvent for the wax having a relatively slow evaporation rate in comparison with the remainder of the solvent mixture. Another technique involves the inclusion of a suitable resinous gum in a casting solution used in the production of these films. The observance of either or both of these techniques to a sufficient degree will result in films having extremely high moisture resistance equalling, if not surpassing, any at present commercial films. The transparencies of the films produced according to this invention are substantially unimpaired.

Referring to the general types of films to be rendered moisture resistant by the practice of this invention, these films essentially comprise a vinyl resin plasticized with an elastomeric copolymer of a conjugated diolefin and an acrylonitrile the ratio of the weight of the vinyl resin to the weight of the elastomeric copolymer varying from 1:9 to 9:1. Suitable vinyl resins are those based upon vinyl chloride, e. g. polyvinyl chloride; copolymers of vinyl chloride and vinyl acetate or other vinyl carboxylates; copolymers of vinyl chloride and methyl methacrylate or other alkyl acrylates; and copolymers of vinyl chloride and other polymerizable compounds such as vinyl cyanide or vinylidene chloride. Hereinafter all such resins will be generically termed "vinyl resins." Suitable elastomeric copolymers are those made by copolymerization of a butadiene-type compound having the structural formula:

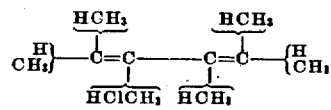

Suitable butadiene-type compounds are exemplified in butadiene; isoprene; 1-methyl-1,3-butadiene; 2,3-dimethyl-1,3-butadiene; and 2-chloro-1,3-butadiene. Suitable acrylonitrile-type compounds include acrylonitrile, methyl acrylonitrile, ethyl acrylonitrile, propyl acrylonitrile and chloro acrylonitrile. Specific exemplary commercial elastomeric copolymers of this type are those known as "Perbunan," "Butaprene N" and "Hycar OR" (trade names respectively of the Standard Oil Company, The Firestone Tire and Rubber Company, and the Hycar Chemical Company). Hereinafter all elastomers having the qualifications just outlined will be designated "butadiene-acrylonitrile type elastomers."

The films of this invention may be formulated and manufactured according to any usual procedure. For instance, the constituents of the films may be dissolved in a volatile solvent to form a cement which is spread onto a moving belt or cylinder, dried, and stripped off. However the present applicant (patentee) has developed certain improved methods for preparing these films. For instance, larger volumes of relatively expensive solvents such as methyl ethyl ketone, are ordinarily necessary to effect solution of the vinyl resins, particularly the more desirable harder types of such resins, in preparing cements for casting the films of this invention. Relatively lesser amounts of these expensive solvents, which may moreover be diluted with relatively cheaper solvents such as benzene, toluene and the like, may be used if the vinyl resin is dissolved at temperatures in the range 70°–80° C. with high speed agitation for from 2 to 4 hours.

Further with regard to the elastomers entering into the films of this invention, it has now become known that butadiene-acrylonitrile elastomers, similarly to natural rubber, are constituted of relatively more soluble and plastic "sol" fractions and relatively insoluble and non-plastic "gel" fractions. Elastomers consisting predominantly of the "sol" fractions are more suitable for the production of films of the type under consideration. The proportions of these fractions can be varied by suitable techniques. For instance, it has been found that relatively higher proportions of "sol" elastomer are obtained when the polymerization is conducted in the presence of "regulating" or "modifying" agents, as disclosed in the patent to Wollthan No. 2,281,613. Likewise, freshly prepared elastomers contain a larger proportion of the "sol" fraction than aged elastomers. Still further, the sol fraction is higher in those elastomers which have not been subjected to oven drying. Accordingly, in certain preferred embodiments of this invention, the elastomer is obtained from a freshly prepared latex which has been produced by polymerization in the presence of "modifying" agents. The latex is coagulated by the addition of a water-soluble organic solvent such as methanol, ethanol, acetone, methyl ethyl ketone, ethyl acetate, etc., or by the addition of a small amount of an inorganic salt, such as alum. The coagulum is washed, pressed free of water as far as possible, and then directly dissolved in a suitable water-soluble volatile organic solvent such as above named to form a cement which may be used as a basis for the film-casting solution.

The waxes employed as moistureproofing agents according to this invention include any amorphous or micro-crystalline mineral or vegetable waxes melting in the range 125°–200° F. Examples of suitable micro-crystalline paraffin waxes are those sold by the Petroleum Specialties Corporation under the names "Aristowax 145" and "Aristowax 160." Examples of other suitable waxes are those sold by the S. C. Johnson & Son Company under their designation "W. M. 169B" and "W. M. 243." Likewise suitable are the various halogenated paraffin waxes. There may also be employed various naturally-occurring waxes such as carnauba wax, candelilla wax, ozokerite, montan wax, beeswax and the like. The amount of the selected wax to be incorporated in order to secure a substantial degree of moistureproofing effect must be above about 0.2%, based on the weight of the film. Incorporation of a less proportion will not result in any worthwhile increase in the moistureproofing characteristics of the film, and in fact there is a definite tendency for the moisture transmission to increase rather than to diminish with low proportion of wax (for instance see Example II hereinafter). Proportion of wax in excess of 0.2% result in increasing degree of moisture transmission resistance, a maximum being attained at about 0.4%, after which the moisture resistance again decreases. The moisture resistance again increases in the neighborhood of 1.0%, but in this range it is often impossible, even by the exercise of the techniques hereinafter detailed, to obtain absolutely clear films.

As noted above special techniques must be employed in order to obtain haze-free and moisture resistant films when waxes are incorporated therein in accordance with this invention. The first of these techniques involves casting the film from mixed solvents containing a major proportion of a relatively rapidly evaporating solvent or solvents for the film constituents, together with a minor proportion of a relatively slowly evaporating solvent or solvents for the wax employed. Suitable rapidly evaporating solvents include for instance methyl ethyl ketone, acetone, benzene, methanol, isopropanol, etc. Suitable relatively slowly evaporating solvents include xylene, toluene, turpentine and the like. For a discussion of slowly and rapidly evaporating solvents see "Industirial Solvents" by Ibert Melian, Reinhold Publishing Corp., 1939, pp. 50–62. In general, for best results, the solvent mixture should contain approximately 15% of these slowly evaporating solvents, although suitable results are obtained with somewhat less proportions of these solvents (see Example III). In general a preferred range will be between about 10% and about 25% of slowly evaporating solvent, based on the total weight of solvent mixture.

An alternative device for securing clarity of the film involves the addition, to the casting cement, of a substantial proportion of a suitable resinous gum. If a sufficient amount (for instance about 3% based on the weight of the film) of a suitable gum is employed, clear films containing effective quantities of moistureproofing waxes may be deposited from solutions not containing the special slowly-evaporating solvents detailed in the preceding paragraph. Quantities of gum greater than 3% are not ordinarily necessary in order to secure clarity of the films but do not in any event detract from the clarity or moisture transmission resistant qualities thereof. In fact, in some cases it may be advantageous to incorporate as much as 30% of gum, based on the weight of the film. Suitable resinous gums for this purpose include ester gum, gum elemi, rosin oil, linseed oil, mastic gum, sandarac gum, gum dammar, garentula, fish oil, sod oil, palm oil and the like.

The techniques involving the use of slowly evaporating solvents and of resinous gums may likewise be used concurrently to secure better clarity of the films. In such cases, of course, either or both of the techniques may be less intensively employed. For instance a film produced from a cement containing 2% of ester gum and 10% of xylene will have a satisfactory degree of clarity and moisture resistance; if either of these ingredients had been left out, a less satisfactory product would have been produced.

Films prepared according to this invention have a very satisfactory degree of transparency, flexibility, inelastic extensibility, stability against light- and heat-deterioration and other properties admirably suiting them for packaging materials. In addition the films are highly resistant to the passage of moisture therethrough and in certain cases have moisture resistances equal or superior to those of any films heretofore produced commercially. These properties adapt the films for many uses for which they have not heretofore been suitable, for instance in packaging delicate machinery and machine components; packaging food stuffs and other materials which are deteriorated by absorption, or loss of, moisture such as baked goods, dehydrated foods, frozen foods, hygroscopic and efflorescent chemicals and the like; and for many other uses where films of high moisture resistance must be employed. The films are made from the abundant and domestically procurable vinyl resins, elastomers, waxes and gums.

With the foregoing discussion in mind there are given hereinafter detailed examples of the practice of this invention. All parts given are by weight.

EXAMPLE I

| | | Parts |
|---|---|---|
| A | Vinyl resin (copolymer of vinyl choride and vinylidene chloride: "Koron 202" a product of the B. F. Goodrich Company) | 56 |
| | Methyl ethyl ketone: | |
| | 1st portion | 333 |
| | 2nd portion | 195 |
| B | Latex of butadiene-acrylonitrile copolymer (25% solids content; copolymer contains 45% acrylonitrile) | 181 |
| | Xylene | 139 |
| Tetramethyl thiuram disulfide | | 2 |
| Micro-crystalline paraffin wax ("Aristowax 145", product of the Petroleum Specialties Corp.) | | 0, .1, .2, .3, .4, .5, .6, 1.0 or 2.0 |

The above schedule provides 100 parts of resins amounting, in weight, to 15% of the weight of the solvents. A series of films was made up in accordance with the foregoing schedule, using the paraffin wax in each of the proportions of 0.0, 0.1, 0.2, etc. parts listed. In each case, the vinyl resin and first portion of the methyl ethyl ketone were subjected to high speed mixing at 70° C. for 2 hours, resulting in the formation of a smooth cement "A." In the meantime, the latex was coagulated by the addition of a small amount of alum, the coagulum was carefully washed, and pressed to dewater it to a moisture content of 10%. The coagulum was then agitated and dissolved in a mixture of the second portion of the methyl ethyl ketone and the xylene, and this solution "B" was mixed with cement "A." The tetramethyl thiuram disulfide and paraffin wax (if used) were dissolved in the combined solution, which was then filtered and cast to a thickness of .01" on a fabric belt coated with polyvinyl alcohol, dried, and stripped off to yield a film .001" thick. The moisture permeability of each film was determined as follows:

Moisture permeability determination

A cylindrical glass cup 1½" high x 2" in diameter was provided for the test. 15 ml. of water was placed in the cup, and the film to be tested was stretched across the mouth of the cup and cemented to the lips thereof with collodion cement. The assembly was weighed, placed in a desiccator containing fused calcium chloride, and kept at 25° C. The assembly was reweighed at the end of 18 hours, and the loss of moisture recorded in milligrams. The results are tabulated herewith.

Table I

| Wax in Film, per cent | 0.0 | 0.1 | 0.2 | 0.3 | 0.4 | 0.5 | 0.6 | 1.0 | 2.0 |
|---|---|---|---|---|---|---|---|---|---|
| Moisture Loss, mg | 66 | 41 | 5 | 1 | 1 | 2 | 3 | 1 | 1 |
| Appearance of film | clear | clear | clear | clear | clear | clear | slight haze | slight cloud | slight cloud |

By way of comparison, a commercial rubber hydrochloride film tested in this manner resulted in a moisture loss of 3 milligrams. From the table, it is apparent that the optimum range of wax content lies between approximately 0.2% and 0.6%. Below these values, no substantial moistureproofing is obtained, and above these values the moistureproofing is less effective. It is noted that, with a wax content of 1.0%, moistureproofing efficiency again increases, but with some slight sacrifice of the clarity of the film.

EXAMPLE II

| | | Parts |
|---|---|---|
| A | Vinyl resin ("Koron 202") | 56 |
| | Methyl ethyl ketone: | |
| | 1st portion | 333 |
| | 2nd portion | 334 |
| B | Latex of butadiene-acrylonitrile copolymer (25% solids content; copolymer contains 45% acrylonitrile) | 181 |
| | Ester gum | 3 |
| Stannous tertiary butyl catecholate | | 1 |
| Diphenyl thiourea | | 1 |
| Micro-crystalline wax ("Aristowax 145") | | 0, .1, .2, .3, .4, .5, .6, 1.0 or 2.0 |

A series of films was made up in accordance with the foregoing schedule, using the "Aristowax" in each of the proportions 1, .1, .2, etc. parts lasted. The films were prepared exactly as described in Example I, with the exception that the solution "B" was prepared with the second portion of methyl ethyl ketone (recipe of this example) rather than with a mixture of methyl ethyl ketone and xylene as in Example I. The ester gum was dissolved in solution "B." The several films were tested exactly as in Example I, with the following results:

Table II

| Wax in Film, per cent | 0.0 | 0.1 | 0.2 | 0.3 | 0.4 | 0.5 | 0.6 | 1.0 | 2.0 |
|---|---|---|---|---|---|---|---|---|---|
| Moisture Loss, mg | 28 | 33 | 14 | 3 | 1 | 3 | 3 | 3 | 2 |
| Appearance of film | clear | clear | clear | clear | clear | clear | slight haze | slight cloud | slight cloud |

For comparison, a commercial rubber hydrochloride film under the same test results in a moisture loss of 3 milligrams. The same optimum trends will be observed in the films of this example as were observed in connection with the films of Example I. It will be noted further that a slight increase in vapor transmission over the blank film occurred at 0.1% wax content. This is rather anomalous but was confirmed by repeated checking.

Example III

|  | Parts |
|---|---|
| A { Vinyl resin ("Koron 202") | 56 |
| Methyl ethyl ketone: |  |
| 1st portion | 333 |
| 2nd portion | 334, 201, 167, 134, 102, or 69 |
| B { Latex of butadiene-acrylonitrile copolymer (25% solids content; copolymer contains 45% acrylonitrile) | 181 |
| Xylene | 0, 33, 67, 100, 132 or 165 |
| Tetramethyl thiuram disulfide | 2 |
| Micro-crystalline wax ("Aristowax 145") | 0.4 |

A series of films was cast from cements made up in accordance with the foregoing schedule, varying amounts of the second portion of the methyl ethyl ketone and of the xylene inversely to keep the sum thereof equal to 334 parts; this resulted in solvent media containing 0, 5, 10, 15, 20 and 25% of xylene, based on the total weight of solvent. The moisture permeabilities and transparencies of the several films were determined as before and are tabulated herewith:

Table III

| Xylene in solvent, (per cent) | 0 | 5 | 10 | 15 | 20 | 25 |
|---|---|---|---|---|---|---|
| Moisture Loss, mg | 3 | 4 | 5 | 2 | 1 | 5 |
| Appearance of films | cloudy | cloudy | slight haze | clear | clear | slight haze |

Example IV

|  | Parts |
|---|---|
| "Vinylite VYNS" (copolymer containing 85% vinyl chloride, 10% vinyl acetate, manufactured by the Carbide & Carbon Chemicals Corp.) | 56 |
| Methyl ethyl ketone | 1000 |
| Butadiene-acrylonitrile copolymer | 45 |
| Ester gum | 30 |
| Micro-crystalline paraffin wax ("Aristowax 145") | 0.3 |

The foregoing ingredients were subjected to high-speed mixing until a clear cement was obtained. This cement was cast as in the preceding examples, resulting in a film which had excellent transparency and moisture transmission resistance.

Example V

|  | Parts |
|---|---|
| A { Vinyl resin, ("Vinylite QYNA," a vinyl chloride polymer manufactured by the Carbide & Carbon Chemicals Corp.) | 56 |
| Methyl ethyl ketone: |  |
| 1st portion | 333 |
| 2nd portion | 195 |
| B { Latex of butadiene-acrylonitrile copolymer | 181 |
| Xylene | 139 |
| Tetramethyl thiuram disulfide | 2 |
| Micro-crystalline paraffin wax ("Aristowax 145") | 0.4 |

The above ingredients were made into a film in accordance with the procedure of Example I. The film had excellent transparency and moisture transmission resistance.

Example VI

|  | Parts |
|---|---|
| Vinyl resin ("Koron 202") | 56 |
| Butadiene-acrylonitrile copolymer (contains 45% acrylonitrile constituent) | 45 |
| Ester gum | 5 |
| Methyl ethyl ketone | 400 |
| Xylene | 100 |
| Aliphatic hydrocarbon solvent (boiling range 80°–120° C.) | 200 |
| Micro-crystalline paraffin wax ("Aristowax 145") | .5 |

A cement was made up from the foregoing ingredients and cast to form a film having the same excellent properties characterizing the films in the optimum ranges of the preceding examples.

Example VII

|  | Parts |
|---|---|
| Vinyl resin ("Koron 202") | 56 |
| Butadiene-acrylonitrile copolymer (containing 45% acrylonitrile constituent) | 45 |
| Methyl ethyl ketone | 750 |
| Turpentine | 75 |
| Micro-crystalline paraffin wax | 0.4 |

A cement was made from the foregoing ingredients and cast to form a film having excellent transparency and moisture transmission resistance.

From the foregoing general discussion and detailed examples it will be apparent that there are provided by this invention novel transparent and self-supporting films having degrees of moisture vapor resistance equal to or greater than any films heretofore appearing on the market. The films require as constituents the domestically produced and prospectively abundant vinyl resins, butadiene-acrylonitrile elastomers, waxes, and gums.

What is claimed is:

1. A flexible, self-supporting, transparent film comprising (1) an elastomeric copolymer of butadiene-1,3 and acrylonitrile and (2) a resin selected from the group consisting of homopolymers of vinyl chloride, copolymers thereof with vinyl acetate and copolymers thereof with vinylidene chloride, said film being rendered resistant to the passage of moisture therethrough by the presence therein of (3) from 0.2% to 2.0% of a micro-crystalline paraffin wax melting in the range 125°–200° F., the ratio of the weight of the selected resin to the weight of the elastomeric copolymer being from 1:9 to 9:1.

2. A flexible, self-supporting, transparent film comprising (1) an elastomeric copolymer of butadiene-1,3 and acrylonitrile and (2) a resin selected from the group consisting of homopolymers of vinyl chloride, copolymers thereof with vinyl acetate and copolymers thereof with vinylidene chloride, said film being rendered resistant to the passage of moisture therethrough by the presence therein of (3) from 0.2% to 0.6% of a micro-crystalline paraffin wax melting in the range 125°–200° F., the ratio of the weight of the selected resin to the weight of the elastomeric copolymer being from 1:9 to 9:1.

3. A flexible, self-supporting, transparent film comprising (1) an elastomeric copolymer of butadiene-1,3 and acrylonitrile and (2) a resin selected from the group consisting of homopolymers of vinyl chloride, copolymers thereof with vinyl acetate and copolymers thereof with vinylidene chloride, said film being rendered resistant to the passage of moisture therethrough by the presence therein of (3) from 0.2% to 0.6% of a microcrystalline paraffin wax melting in the range 125°-200° F. said film further containing (3a) from 3% to 30% of ester gum, the ratio of the weight of the selected resin to the weight of the elastomeric copolymer being from 1:9 to 9:1.

SIEGFRIED M. KINZINGER.

REFERENCES CITED

The following references are of record in the file of this patent:

UNITED STATES PATENTS

| Number | Name | Date |
|---|---|---|
| 2,051,944 | Hershberger | Aug. 25, 1936 |
| 2,201,747 | Staudt | May 21, 1940 |
| 2,284,100 | Meigs | May 26, 1942 |
| 2,316,274 | Mitchell | Apr. 13, 1943 |

OTHER REFERENCES

Hycar Bluebook, Hycar Chemical Co., Akron, Ohio, Sec. IV, Group C, pages 1 to 5. Jan. 15, 1944.

Certificate of Correction

Patent No. 2,445,727.                                                                     July 20, 1948.

SIEGFRIED M. KINZINGER

It is hereby certified that errors appear in the printed specification of the above numbered patent requiring correction as follows:

Column 2, line 44, after the formula insert *with from 10 to 90%, based on the total polymerizable constituents, of an acrylonitrile-type compound having the formula*

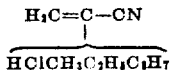

*in which formulae each bracket indicates the attachment of one of the substituents shown embraced thereby.*; column 6, line 56, Example II, for "proportions 1, .1, .2, etc." read *proportions 0, .1, .2, etc.*;

and that the said Letters Patent should be read with these corrections therein that the same may conform to the record of the case in the Patent Office.

Signed and sealed this 4th day of January, A. D. 1949.

[SEAL]

THOMAS F. MURPHY,
*Assistant Commissioner of Patents.* of the selected resin to the weight of the elastomeric copolymer being from 1:9 to 9:1.

3. A flexible, self-supporting, transparent film comprising (1) an elastomeric copolymer of butadiene-1,3 and acrylonitrile and (2) a resin selected from the group consisting of homopolymers of vinyl chloride, copolymers thereof with vinyl acetate and copolymers thereof with vinylidene chloride, said film being rendered resistant to the passage of moisture therethrough by the presence therein of (3) from 0.2% to 0.6% of a microcrystalline paraffin wax melting in the range 125°–200° F. said film further containing (3a) from 3% to 30% of ester gum, the ratio of the weight of the selected resin to the weight of the elastomeric copolymer being from 1:9 to 9:1.

SIEGFRIED M. KINZINGER.

REFERENCES CITED

The following references are of record in the file of this patent:

UNITED STATES PATENTS

| Number | Name | Date |
| --- | --- | --- |
| 2,051,944 | Hershberger | Aug. 25, 1936 |
| 2,201,747 | Staudt | May 21, 1940 |
| 2,284,100 | Meigs | May 26, 1942 |
| 2,316,274 | Mitchell | Apr. 13, 1943 |

OTHER REFERENCES

Hycar Bluebook, Hycar Chemical Co., Akron, Ohio, Sec. IV, Group C, pages 1 to 5. Jan. 15, 1944.

Certificate of Correction

Patent No. 2,445,727. July 20, 1948.

SIEGFRIED M. KINZINGER

It is hereby certified that errors appear in the printed specification of the above numbered patent requiring correction as follows:

Column 2, line 44, after the formula insert *with from 10 to 90%, based on the total polymerizable constituents, of an acrylonitrile-type compound having the formula*

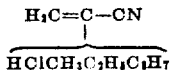

*in which formulae each bracket indicates the attachment of one of the substituents shown embraced thereby.*; column 6, line 56, Example II, for "proportions 1, .1, .2, etc." read *proportions 0, .1, .2, etc.*;

and that the said Letters Patent should be read with these corrections therein that the same may conform to the record of the case in the Patent Office.

Signed and sealed this 4th day of January, A. D. 1949.

[SEAL]

THOMAS F. MURPHY,
*Assistant Commissioner of Patents.*